United States Patent [19]

Epworth

[11] Patent Number: 4,953,939
[45] Date of Patent: Sep. 4, 1990

[54] OPTICAL FIBRE TRANSMISSION SYSTEMS

[75] Inventor: Richard E. Epworth, Bishops Stortford, Great Britain

[73] Assignee: STC PLC, London, England

[21] Appl. No.: 134,549

[22] Filed: Dec. 16, 1987

Related U.S. Application Data

[63] Continuation of Ser. No. 749,050, Jun. 26, 1985, abandoned.

[30] Foreign Application Priority Data

Jul. 11, 1984 [GB] United Kingdom ............... 8417662

[51] Int. Cl.$^5$ ............................................. G02B 6/34
[52] U.S. Cl. ................................. 350/96.19; 350/96.15
[58] Field of Search ............... 350/96.19, 96.15, 96.30

[56] References Cited

U.S. PATENT DOCUMENTS 3,863,063 1/1975 Indig et al. ................. 350/96.30
3,891,302 6/1975 Dabby et al. ................. 350/96.30

FOREIGN PATENT DOCUMENTS 2064161 6/1981 United Kingdom .

OTHER PUBLICATIONS

Optics Letters, Jan. 1982, vol. 7, No. 1, pp. 37–39, "Flow-Optic Integrated Whatever Filters", J. Lapierre et al.

Hill et al., "Photosensitivity in Optical Fiber Waveguides"; Appl. Phys. Lett.; vol. 32, No. 10; May 1978; pp. 647–9.

Primary Examiner—William L. Sikes
Assistant Examiner—Robert E. Wise
Attorney, Agent, or Firm—Lee, Mann, Smith, McWilliams & Sweeney

[57] ABSTRACT

A device for producing an optical delay in an optical signal having variable optical frequency, the optical delay varying with the optical frequency, comprises a chirped Bragg reflector formed in an optical fiber and a directional coupler for separating the reflected signal from the input signal. One application of the device is for chromatic dispersion equalization. Various methods of manufacturing the chirped Bragg reflector are described.

17 Claims, 3 Drawing Sheets

OPTICAL FIBRE TRANSMISSION SYSTEMS

This application is a continuation of application Ser. No. 749,050, filed June 26, 1985, now abandoned.

BACKGROUND OF THE INVENTION

This invention relates to optical fibre transmission systems and in particular, but not exclusively, to overcoming chromatic dispersion problems therein.

Chromatic dispersion in optical fibre presents serious problems when using light sources whose spectrum is non-ideal, for example broad or multi-spectral-line. This problem has previously been resolved, at least partially, in two ways. Firstly, by operating at or close to the optical frequency at which the chromatic dispersion is a minimum, for example at a wavelength of 1.3 micron in conventional silica fiber. The frequency does not generally correspond with the frequency of minimum transmission loss and attempts to modify the fibre to shift its frequency of minimum chromatic dispersion usually result in some loss penalty. The second way of overcoming the problem is to use a source with a near ideal spectrum.

SUMMARY OF THE INVENTION

It is an object of the present invention to provide an alternative means to overcome chromatic dispersion problems in optical fibre systems.

According to one aspect of the present invention there is provided a device for producing an optical delay in an optical signal having variable optical frequency, which delay varies with the optical frequency, comprising a chirped Bragg reflector and directional coupler means whereby to apply the optical signal to the Bragg reflector and to separate the optical signal as reflected by the Bragg reflector therefrom, the distance the optical signal travels through the Bragg reflector before reflection varying with the optical frequency and being determined by the chirp of the Bragg reflector.

According to another aspect of the present invention there is provided a method of making a chirped Bragg reflector formed in optical fibre, comprising forming a Bragg reflector in each of a plurality of optical fiber sections whereby each optical fibre Bragg reflector operates at a respective wavelength.

BRIEF DESCRIPTION OF THE DRAWINGS

Embodiments of the invention will now be described with reference to the accompanying drawings in which.

DETAILED DESCRIPTION OF THE INVENTION

Figure 1:
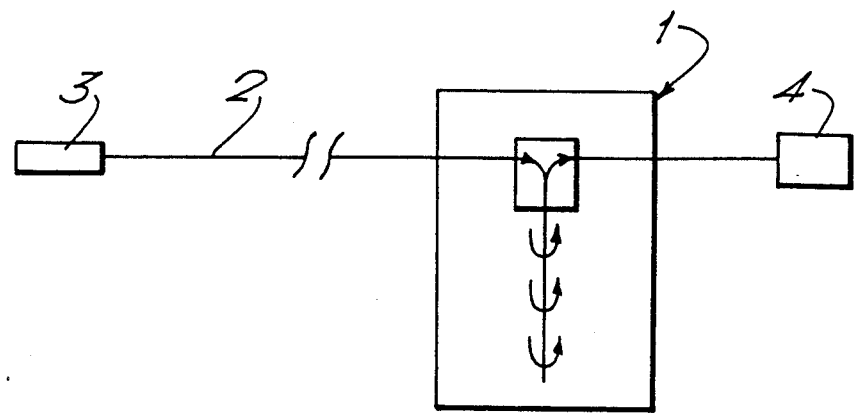
FIG. 1 shows, schematically, a chromatic dispersion equaliser according to the present invention in use in an optical fibre transmission system.

As mentioned above chromatic dispersion problems are generally overcome, or partially overcome, by operating at optical frequencies at which the chromatic dispersion is a minimum, or by using a source with a near ideal spectrum. There is, however, an alternative, that is to equalise the dispersion with an element of equal and opposite dispersion. Since the system is linear such an element 1 (FIG. 1) can be placed at any position along the length of a dispersive single mode optical fibre 2 between the light source 3, for example an imperfect laser source, and a receiver 4. The equaliser element 1 which will be described in greater detail hereinafter basically comprises a directional coupler 5 and a Bragg reflector 6.

Figure 2:
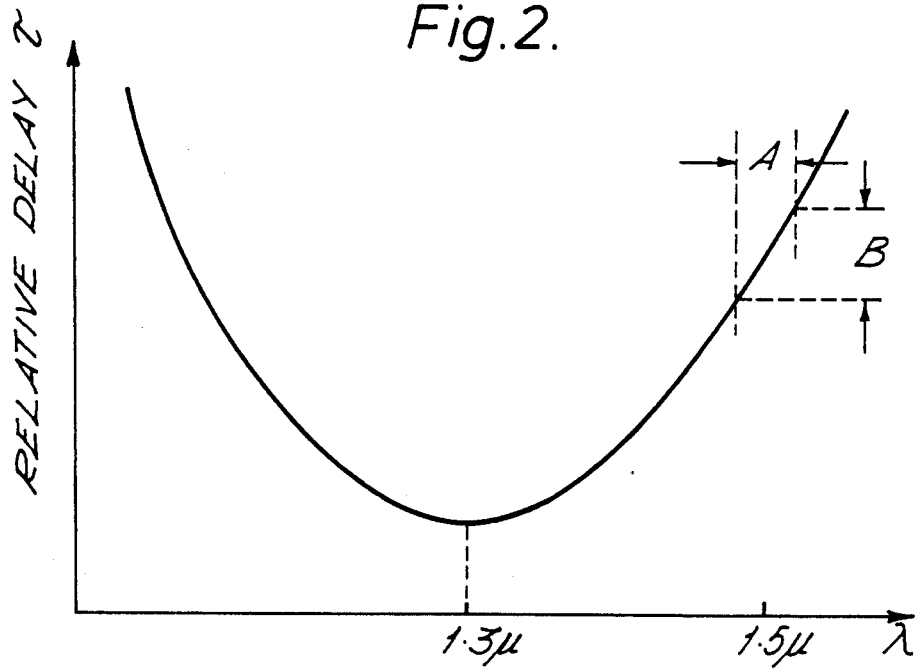
FIG. 2 shows an optical fibre dispersion characteristics graph.
Figure 3:
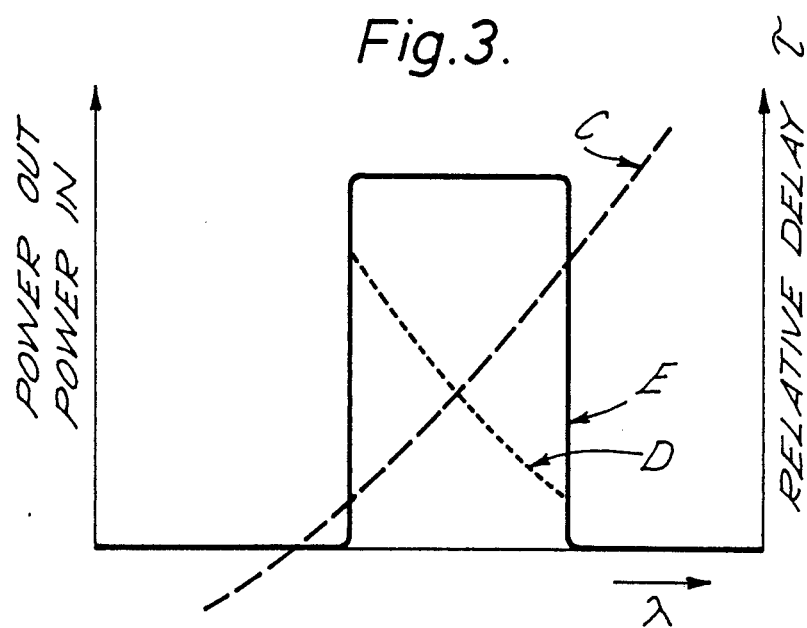
FIG. 3 shows characteristics of the chromatic dispersion equaliser of the present invention.

FIG. 2 shows the fibre dispersion characteristic for a conventional single mode silica fibre, that is a graph of relative delay $\tau$ versus wavelength $\lambda$ (micron). The minimum chromatic dispersion is achieved at a wavelength of 1.3 microns whereas minimum transmission loss can be achieved at a wavelength in the vicinity of 1.55 micron. The spectrum is unstable over the marked wavelength range A with corresponding range of delay fluctuation B. What is required, therefore, is a means of correcting the delay versus optical frequency characteristic, in the region having ranges A and B, that is equalising it. This may be achieved by a device, with at least two ports, which is such that the delay versus optical frequency characteristic may be preset to compensate for the chromatic dispersion inherent in the optical transmission path. FIG. 3 illustrates the characteristics of the equaliser. The dashed line C indicates the relative delay versus wavelength characteristic for the dispersive fibre which is to be equalised. The dotted line D indicates the relative delay versus wavelength characteristic for the equaliser and the solid line E indicates the ratio of optical power in to optical power out versus wavelength, which is a maximum over the equalised wavelength range, as indicated.

Figure 4A:
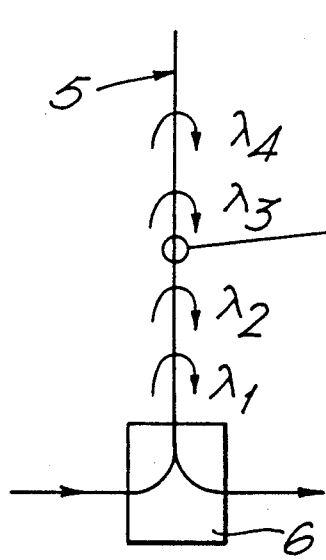
FIG. 4a shows, schematically, a chromatic dispersion equaliser according to the present invention, whilst
Figure 4B:
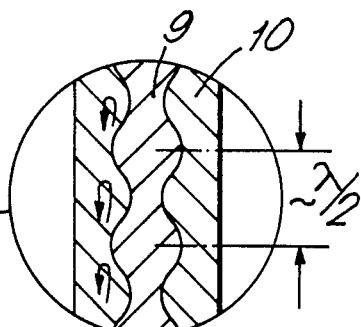
FIG. 4b shows on an enlarged scale a portion of the Bragg reflector thereof.
Figure 5A:
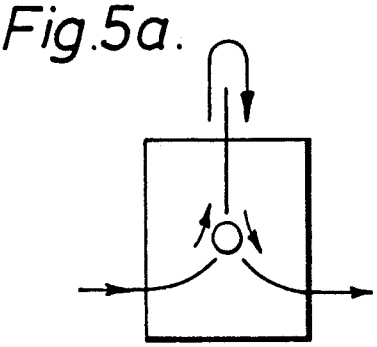
FIGS. 5a, 5b, 5c, and 5d illustrate, schematically, four possible versions of directional coupler which can be used in the chromatic dispersion equaliser of the present invention.
Figure 5B:
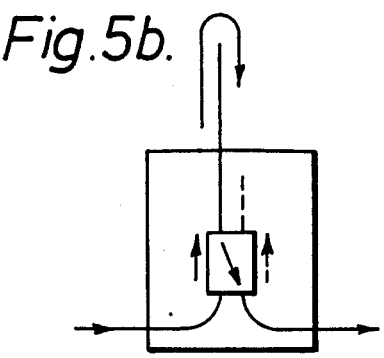
Figure 5C:
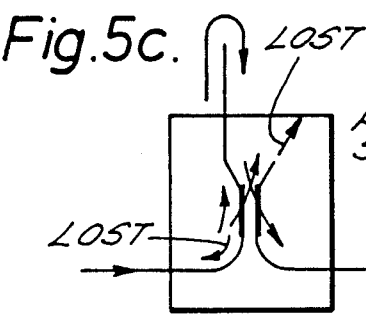
Figure 5D:
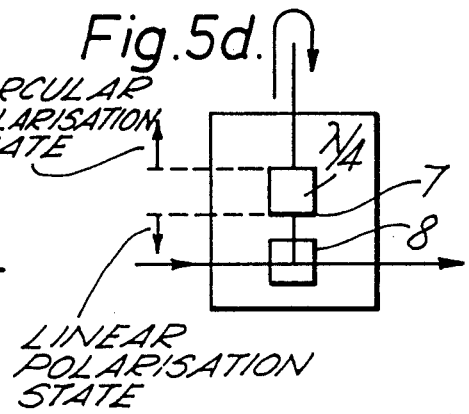

The equaliser element 1 comprises a means for producing an optical delay which varies rapidly with optical frequency, in such a manner as to achieve chromatic equalisation, and is constituted by a chirped distributed Bragg grating formed in a fibre 5 and a directional coupler 6 for separating forward and reverse propagating waves. The element is shown in FIGS. 4a and 4b. The directional coupler 6 may comprise, for example, an optical circulator or isolator or a simple fibre coupler. Any type of optical coupler may be used e.g. a half-silvered mirror or an integrated optics system for example of lithium niobate. Specific examples of directional coupler techniques are illustrated in FIG. 5. Ideally the coupler is low loss, for example this may be achieved by use of an optical circulator (FIG. 5a) or isolator (FIG. 5b). Both of these techniques use Faraday rotation to separate counter propagating energy. The simple fibre coupler (FIG. 5c) may be used but it would introduce a minimum loss of 6 dB (3 dB for each transition). If the input light is in a stable state of polarisation then counter propagating energy could be separated using a quarter wave section 7 and a polarisation splitting element 8 (FIG. 5d). A circular polarisation state would then pertain in the Bragg reflector with a linear polarisation state for the input. This quarter wavelength coupler is also low loss. As indicated in FIG. 4a, the distance which light travels along the Bragg reflector fibre 5 before being reflected varies with optical wavelength λ (optical frequency ω) and is determined by the chirp of the grating.

It has previously been demonstrated (see, for example, "Fiber-optic integrated interference filters" J. Lapierre et al. OPTICS LETTERS January 1982 Vol. 7 No. 1 pp 37-39) that it is possible to "write" or "record" Bragg reflectors in optical fibre simply by launching into it a high optical power level beam and ensuring that there is sufficient end reflection to produce a standing wave in the fibre. After a short time (seconds to minutes) the reflectivity at the employed pumping frequency increases dramatically because a Bragg reflector, precisely matched to the pumping frequency, is formed. This grating is permanent and continues to operate at any power level. As illustrated schematically in FIG. 4b after the grating is made the fibre 5, having core 9 and cladding 10, has a periodic structure due to a photo-induced refractive index change, the period being approximately half the wavelength of the employed pump source, and Bragg reflection from this periodic structure is obtainable. The length of the grating formed is dependent on the writing power used, it may be as short as 0.1 cm with very high writing powers or several meters with low writing powers.

For use in an equaliser element a Bragg reflector is required in which the periodicity, and thus the optical frequency at which it reflects, is varied along the fibre length in a predetermined manner. This variation may be achieved in a number of ways, of which the following are examples.

Using a tunable high power laser, several separate sections of optical fiber are exposed to different optical frequencies and subsequently joined (spliced) together to form a single fiber. The chirp thus achieved would be discontinuous, but provided the number of sections is sufficiently large, little penalty will result.

Alternatively, a single frequency laser may be employed to expose several separate sections of optical fibre whilst the sections are extended in length to different extents, by for example stress, strain, change in temperature, or any combination thereof. When a fibre section is returned to its normal state the induced grating will have altered its resonant frequency. A number of such fibre sections can thus be joined to make a single fibre. Alternatively the reverse procedure may be applied, that is the fibre may be stretched or heated after formation of the grating, that is whilst in use, however this is less attractive for reasons of fibre fatigue. It is considered that it would be acceptable to fine tune the chirp prior to use by applying low levels of strain.

Figure 6:
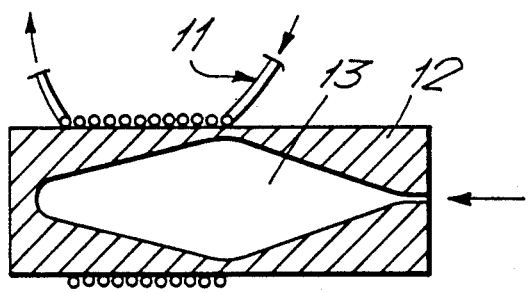
FIG. 6 illustrates a cross-section through a mandrel on which an optical fibre is wound.

A further possibility comprises exposing a single continuous length of optical fiber using a single frequency laser whilst a strain/stress/temperature gradient is maintained along its length. When the perturbing gradient is subsequently removed after induction of the grating, the grating will have acquired a chirp. A stress/strain gradient can be applied to an optical fibre 11 by winding the fibre onto a deformable mandrel. Such a mandrel 12 is illustrated in FIG. 6. The cavity 13 is so shaped that when pressure is introduced to expand the mandrel 12 the fibre 11 wound thereon is stretched, there being a strain gradient along the length of the fibre in view of the variation in wall thickness of the mandrel. The pressure in the cavity 13 is maintained whilst the grating is being "written" in the fibre. Similarly the chirp may be adjusted after recording (i.e. for use) by applying a controllable strain gradient.

In the case of a system having a fiber to be equalised which has the characteristics shown in FIG. 3 (dashed line) the chirped Bragg reflector will be required to allow the shorter wavelengths to travel further along the reflector fibre before reflection than the longer wavelengths thereby to compensate for the different delay values. The actual chirp required will be determined by the particular optical transmission path.

The equaliser elements proposed by the present invention enable very high dispersion to be achieved in a guided wave structure of low overall size and in use provide an optical delay which varies rapidly with applied optical frequency and can by appropriate construction of the chirped distributed Bragg reflector be preset to compensate for the chromatic dispersion inherent in an optical transmission path.

Whereas the device has been described above in terms of chromatic equaliser applications it is not to be considered as so limited. Any predetermined amount of optical delay in an optical signal having variable optical frequency, which delay varies with optical frequency, can be achieved in dependence on the chirp of the grating and the chromatic equaliser is only a particular case thereof. The device offers the production of very high dispersion in a guided wave structure of low overall size. Such a device may also be used to achieve optical pulse compression/expansion. A chirped laser may thus produce narrow pulses of much higher peak power.

I claim:

1. A chromatic dispersion equaliser which produces an equalising optical delay for an optical signal having variable wavelength and transmitted along an optical fiber, which variable wavelength results in chromatic dispersion in the form of unwanted delay of the transmitted optical signal, which unwanted delay varies with the variations in the wavelength and which equalising optical delay is to compensate for said unwanted delay, the optical fibre having a delay versus wavelength characteristic with a minimum delay at a particular wavelength, the delay decreasing with increasing wavelength up to said particular wavelength and increasing with increasing wavelength after said particular wavelength, the chromatic dispersion equaliser comprising a chirped Bragg reflector and directional coupler means associated with the chirped Bragg reflector, the directional coupler means, in use of the equaliser, coupling the optical signal transmitted along the optical fiber to the chirped Bragg reflector and redirecting the optical signal as reflected by the chirped Bragg reflector back into the optical fiber to continue its transmission therealong, the chirped Bragg including means responsive to the wavelength to vary the distance the optical signal travels through the chirped Bragg reflector before reflection depending on the wavelength and to produce said equalising optical delay in response to said wavelength and thus compensate for said unwanted delay and equalise the chromatic dispersion of the transmitted signal, the distance variation being such that for wavelength variations below said particular wavelength longer wavelengths have to travel further distances than shorter wavelengths before said reflection, and for wavelength variations above said particular wavelength shorter wavelengths have to travel further distances than longer wavelengths before said reflection.

2. The chromatic dispersion equaliser of claim 1, wherein the chirped Bragg reflector is a chirped distributed Bragg grating permanently written in another optical fiber, which other optical fiber is coupled to said first mentioned optical fiber by said directional coupler.

3. The chromatic dispersion equaliser of claim 2, wherein the directional coupler means is an optical circulator coupler.

4. The chromatic dispersion equaliser of claim 2, wherein the directional coupler means is an optical isolator coupler.

5. The chromatic dispersion equaliser of claim 2, wherein the directional coupler means is a fibre coupler.

6. The chromatic dispersion equaliser of claim 2, and for use with an optical signal of stable polarisation state, wherein the directional coupler means is a polarisation splitting element, coupled between portions of said first mentioned optical fiber, and a quarter wave section element coupled between the polarisation splitting element and the Bragg grating optical fiber.

7. The chromatic dispersion equaliser of claim 2, wherein the directional coupler means is a semi-silvered mirror.

8. The chromatic dispersion equaliser of claim 2, wherein the directional coupler means is an integrated optic device.

9. The chromatic dispersion equaliser of claim 2, wherein the chirped distributed Bragg grating is a plurality of optical fibre sections jointed together in tandem, each of said optical fibre sections having a respective grating permanently written therein which reflects optical signals with a predetermined respective optical frequency.

10. The chromatic dispersion equaliser of claim 2, wherein the chirped distributed Bragg grating is permanently written in a single length of said other optical fiber, the reflective properties of the grating being graded along the length of the other fiber such that different sections thereof reflect optical signals with different optical frequencies.

11. A method of making a chirped Bragg reflector formed in optical fiber, comprising the steps of permanently writing a Bragg reflector in each of a plurality of optical fiber sections, which writings are performed in such a manner that each optical fiber Bragg reflector operates at a respective wavelength.

12. The method of claim 11, wherein the optical fiber sections are initially separate and each is exposed to the output of a tunable high power laser at a respective optical frequency in such a manner as to permanently write a Bragg reflector therein, and wherein the optical fiber sections with the Bragg reflectors permanently written therein are joined in tandem to produce a single optical fiber.

13. The method of claim 12, wherein the optical fiber sections are initially separate and each section is exposed to the output of a single frequency laser, which exposure is carried out with the fiber sections subjected to different conditions in such a manner that each Bragg reflector is permanently written in the fiber sections by exposure to the laser reflects at a respective optical frequency.

14. The method of claim 13, wherein the optical fibre sections are initially separate and each section is exposed to the output of a single frequency laser, which exposure is carried out with the fibre sections subjected to different conditions in such a manner that each Bragg reflector is permanently written in the fiber sections by exposure to the laser reflects at a respective optical frequency.

15. The method of claim 14, wherein said gradient of conditions is selected from the group consisting of a strain gradient, a stress gradient and a temperature gradient.

16. The method of claim 14, including the step of winding the fibre on a hollow deformable mandrel of non-uniform wall thickness and applying pressure to the interior of the mandrel whereby to produce a strain gradient in the fibre.

17. In an optical transmission system comprising a length of optical fiber; an optical source coupled to one end of the length of optical fiber, the source producing an optical signal for transmission along the fiber, which optical signal is of variable wavelength, and an optical signal receiver coupled to the other end of the length of optical fiber, the variation of the wavelength of the optical signal transmitted along the fiber between the source and the receiver resulting in chromatic dispersion in the form of unwanted optical delay of the transmitted optical signal, which unwanted optical delay varies with the variations in the wavelength;

the improvement comprising:
means for equalising said unwanted optical delay, said means including a directional coupler and a chirped Bragg reflector, the directional coupler being disposed between two length portions of the optical fiber and coupling the optical fiber to the chirped Bragg reflector, the optical fibre having a delay versus wavelength characteristic with a minimum delay at a particular wavelength, the delay decreasing with increasing wavelength up to said particular wavelength and increasing with increasing wavelength after said particular wavelength, the directional coupler coupling the optical signal transmitted to it by said source to the chirped Bragg reflector and redirecting the optical signal reflected by the chirped Bragg reflector to the receiver, the chirped Bragg reflector including means responsive to the wavelength to vary the distance the optical signal travels through the chirped Bragg reflector before reflection depending on the wavelength and to produce an equalizing optical delay in response to said wavelength which compensates for said unwanted delay, the distance variation being such that for wavelength variations below said particular wavelength longer wavelengths have to travel further distances than shorter wavelengths before said reflection, and for wavelength variations above said particular wavelength shorter wavelengths have to travel further distances than longer wavelengths before said reflection.

* * * * *